United States Patent [19]

Gleinig et al.

[11] 4,342,867
[45] Aug. 3, 1982

[54] PROCESS FOR THE PREPARATION OF CATIONIC DYESTUFFS

[75] Inventors: Harald Gleinig, Odenthal; Bernd Berger-Lohr, Leverkusen; Kurt Breig, Cologne, all of Fed. Rep. of Germany

[73] Assignee: Bayer Aktiengesellschaft, Leverkusen, Fed. Rep. of Germany

[21] Appl. No.: 245,412

[22] Filed: Mar. 19, 1981

[30] Foreign Application Priority Data

Apr. 5, 1980 [DE] Fed. Rep. of Germany ....... 3013272

[51] Int. Cl.$^3$ .......................................... C07D 209/40
[52] U.S. Cl. .................................. 542/417; 260/165
[58] Field of Search ........................................ 542/417

[56] References Cited

U.S. PATENT DOCUMENTS 3,973,903  8/1976  Clarke ............................ 542/417
4,281,112  7/1981  Lehment et al. .................... 542/417

FOREIGN PATENT DOCUMENTS 2825296 12/1979  Fed. Rep. of Germany .
2263284  3/1975  France .
1544290  4/1979  United Kingdom .

OTHER PUBLICATIONS

Chemical Abstracts, vol. 83, 1975.

*Primary Examiner*—Arthur P. Demers
*Attorney, Agent, or Firm*—Sprung, Horn, Kramer & Woods

[57] ABSTRACT

Cationic dyestuffs of the general formula

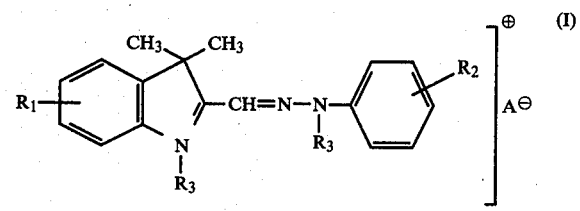

wherein
  $R_1$ represents hydrogen, $C_1$–$C_4$-alkyl, $C_1$- to $C_4$-alkoxy, nitro or halogen,
  $R_2$ represents hydrogen, $C_1$- to $C_4$-alkyl, $C_1$- to $C_4$-alkoxy, halogen or phenylazo,
  $R_3$ represents $C_1$- to $C_3$-alkyl and
  $A^\ominus$ represents an anion,
are prepared by reacting azo bases of the general formula

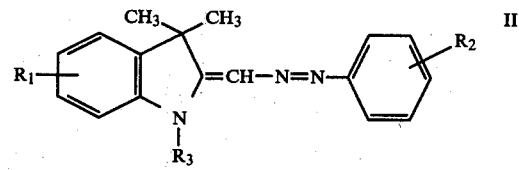

wherein $R_1$, $R_2$ and $R_3$ have the abovementioned meaning, with dialkyl sulphates of the general formula

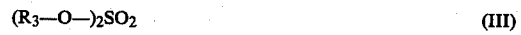

$$(R_3-O-)_2SO_2 \quad (III)$$

wherein $R_3$ has the abovementioned meaning, in the absence of organic solvents and in the presence of water, the weight ratio of azo base to water being 100:15–100 and the molar ratio of azo base to dialkyl sulphate being 1:1.5–2.5, and, if desired, by replacing the alkyl-sulphate anion with another anion.

7 Claims, No Drawings

PROCESS FOR THE PREPARATION OF CATIONIC DYESTUFFS

The present invention relates to a process for the preparation of cationic dyestuffs of the general formula

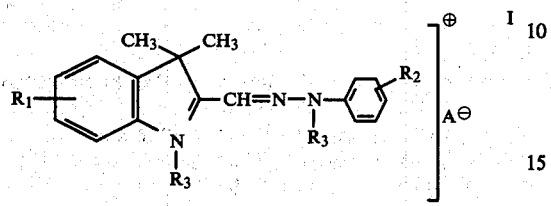

wherein
$R_1$ represents hydrogen, $C_1$–$C_4$-alkyl, $C_1$- to $C_4$-alkoxy, nitro or halogen,
$R_2$ represents hydrogen, $C_1$- to $C_4$-alkyl, $C_1$- to $C_4$-alkoxy, halogen or phenylazo,
$R_3$ represents $C_1$- to $C_3$-alkyl and
$A^{\ominus}$ represents an anion,
by reacting azo bases of the general formula

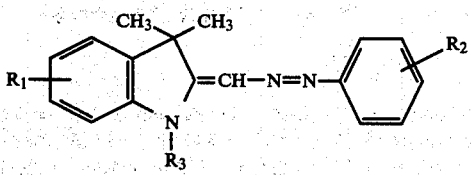

wherein $R_1$, $R_2$ and $R_3$ have the abovementioned meaning, with dialkyl sulphates of the general formula $$(R_3\text{—O—})_2SO_2 \qquad (III)$$

wherein $R_3$ has the abovementioned meaning, in the absence of organic solvents and in the presence of water, the weight ratio of azo base to water being 100:15–100 and the molar ratio of azo base to dialkyl sulphate being 1:1.5–2.5, and, if desired, by replacing the alkyl-sulphate anion with another anion.

The process according to the invention makes it possible to effect quantitative conversion of the weak dye bases II, which are difficult to quaternise completely, to the dyestuffs I in a rapid reaction.

The process is as a rule carried out in a pH range of 6–10 using acid-binding agents such as sodium carbonate, magnesium oxide or sodium hydroxide solution at temperatures between 50° and 100° C. and requires only very short reaction times of about 30 minutes to about 1.5 hours.

An essential criterion for the process according to the invention is the ratio of azo base:water:dialkyl sulfate, which in the indicated ranges results in a melt.

The preferred weight ratio of azo base:water is 100:20–70, and the preferred molar ratio of azo base:dialkyl sulphate is 1:1.5–2.

A particularly suitable embodiment of the process comprises initially introducing the quaternising agent—optionally together with a portion of an acid-binding agent—and then introducing the azo base, in the dry form or in the form of a moist paste, with the remainder of the acid-binding agent, the quaternising agent for the dye base serving at the same time as a solvent. The corresponding amount of water is preferably added last.

In the formulae, halogen is preferably understood as meaning chloride or bromine.

Preferably:
$R_1$ represents hydrogen, methyl or methoxy,
$R_2$ represents hydrogen, methyl, ethyl, methoxy, ethoxy or phenylazo,
$R_3$ represents methyl or ethyl and
$A^{\ominus}$ represents methosulphate, ethosulphate, chloride, sulphate, phosphate or acetate or mixtures of these anions.

The process according to the invention is particularly suitable for the preparation of the dyestuffs of the formula I wherein
$R_1$ repesents hydrogen,
$R_2$ represents hydrogen, methoxy, methyl or phenylazo,
$R_3$ represents methyl and
$A^{\ominus}$ represents the abovementioned anions,
and especially for the preparation of the dyestuff of the formula

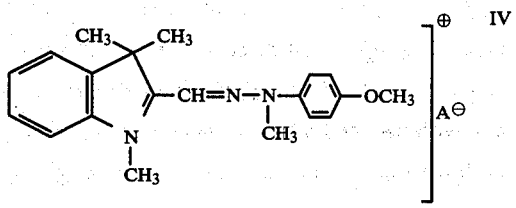

compared with known aqueous quaternisation processes which operate with a relatively large weight ratio of water:azo base, for example the process disclosed in DE-OS (German Published Specification) No. 2,509,622, the advantage of the process according to the invention is that considerably less quaternising agent is required for quantitative conversion.

Compared with the anhydrous quaternisation processes, for example the process disclosed in DE-OS (German Published Specification) No. 2,825,296, considerably shorter reaction times are required with the process according to the invention, and, in addition, more complete conversions are achieved.

In detail, the preferred process can be carried out by, for example, initially introducing the dialkyl sulphate and a portion of the acid-binding agent and introducing a dye base of the general formula II, in the dry form or if desired in the form of a moist paste, together with the remainder of the acid-binding agent at 50°–65° C. at a rate such that the pH value does not fall below 7 and is preferably 7–9. The corresponding amount of water is then added.

The temperature is then raised to 65°–100° C. to effect quantitative conversion, and a virtually homogeneous melt forms.

The pH of the reaction mixture is then adjusted to 1–7 and preferably 3–6 with acid, for example hydrochloric acid, sulphuric acid, acetic acid or phosphoric acid, and the mixture is evaporated to dryness, for example in a vacuum paddle drier or spray drier.

The process provides valuable cationic hydrazone dyestuffs which have the fastness properties customary in the trade and have clear, brilliant colour shades. It has the advantage that no effluent is produced.

EXAMPLE 307 g of the dye base of the formula

[Structure: 3,3-dimethyl-1-methyl-2-(CH=N-N=)-indoline with p-OCH₃ phenyl]

and, simultaneously with this, 128 g of sodium carbonate are introduced at 50°–60° C. into 252 g of dimethyl sulphate and 10 g of sodium carbonate. After adding 100 g of water, the temperature is raised to about 80° C. and the mixture is stirred for about a further 30 minutes until no further starting material can be detected by thin layer chromatography. If necessary, further small amounts of sodium carbonate and dimethyl sulphate are added. The pH of the reaction melt is then brought to 4–6 with hydrochloric acid and the melt is evaporated to dryness in a vacuum paddle drier. About 620 g of the dyestuff of the formula IV with the corresponding content of reaction salts result. The reaction product can be used for dyeing without further purification. The dyestuff dyes polyacrylonitrile in golden yellow colour shades.

Analogously to this example, the dye bases of the general formula II in which $R_1$ represents hydrogen, $R_2$ represents hydrogen, p-$CH_3$ or

[Structure: p-N=N-phenyl]

and $R_3$ represents methyl can also be converted to the corresponding cationic dyestuffs.

We claim:

1. Process for the preparation of cationic dyestuffs of the general formula

[Structure of cationic dyestuff with $R_1$, $R_2$, $R_3$ substituents and anion $A^\ominus$]

wherein
$R_1$ represents hydrogen, $C_1$- to $C_4$-alkyl, $C_1$- to $C_4$-alkoxy, nitro or halogen,
$R_2$ represents hydrogen, $C_1$- to $C_4$-alkyl, $C_1$-to $C_4$-alkoxy, halogen or phenylazo,
$R_3$ represents $C_1$- to $C_3$-alkyl and
$A^\ominus$ represents an anion,
by reacting azo bases of the general formula

[Structure of azo base with $R_1$, $R_2$, $R_3$ substituents]

with dialkyl sulphates of the general formula $$(R_3-O-)_2SO_2$$

in the absence of organic solvents and in the presence of water, and, if desired, by replacing the alkylsulphate anion with another anion, characterised in that the weight ratio of azo base to water is 100:15–100 and the molar ratio of azo base to dialkyl sulphate is 1:1.5–2.5.

2. Process according to claim 1, characterised in that the weight ratio of azo base to water is 100:20–70 and the molar ratio of azo base to dialkyl sulphate is 1:1.5–2.

3. Process according to claim 1, characterised in that the dialkyl sulphate and an acid-binding agent are initially introduced and the azo base and further acid-binding agent and then water are added.

4. Process according to claim 3, characterised in that the azo base is added in the form of a moist paste.

5. Process according to claim 1, characterised in that the reaction is carried out at pH values of 6–10.

6. Process according to claim 1, characterised in that the reaction is carried out at 50°–100° C. for 30 minutes to 1.5 hours.

7. Process for the preparation of cationic dyestuffs of the formula of claim 1, wherein
$R_1$ represents hydrogen, methyl or methoxy,
$R_2$ represents hydrogen, methyl, ethyl, methoxy, ethoxy or phenylazo,
$R_3$ represents methyl or ethyl and
$A^\ominus$ represents methosulphate, ethosulphate, chloride, sulphate, phosphate or acetate or mixtures of these anions.

* * * * *